US009070066B1

(12) United States Patent
Oliver et al.

(10) Patent No.: US 9,070,066 B1
(45) Date of Patent: Jun. 30, 2015

(54) RFID TAGS WITH INDUCTIVELY COUPLED ANTENNAS

(71) Applicant: Impinj, Inc., Seattle, WA (US)

(72) Inventors: Ron Oliver, Seattle, WA (US); Harley Heinrich, Snohomish, WA (US); Ron Koepp, Snoqualmie, WA (US); Christopher Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 14/095,858

(22) Filed: Dec. 3, 2013

Related U.S. Application Data

(60) Provisional application No. 61/754,897, filed on Jan. 21, 2013.

(51) Int. Cl.
*G06K 19/07* (2006.01)
*H01P 11/00* (2006.01)

(52) U.S. Cl.
CPC ............ *G06K 19/0723* (2013.01); *H01P 11/00* (2013.01)

(58) Field of Classification Search
CPC ............................ H01P 11/00; G06K 19/0723
USPC ........................ 235/492; 340/752.1; 343/786
See application file for complete search history.

(56) References Cited

U.S. PATENT DOCUMENTS

| 7,750,813 | B2 * | 7/2010 | Deavours et al. | .......... 340/572.7 |
| 8,188,972 | B1 * | 5/2012 | Krenz et al. | .................. 345/157 |
| 8,881,373 | B1 * | 11/2014 | Koepp et al. | ..................... 29/600 |
| 2005/0110119 | A1 * | 5/2005 | Chen | .............................. 257/620 |
| 2005/0123674 | A1 * | 6/2005 | Stasiak et al. | ................... 427/62 |
| 2006/0214798 | A1 * | 9/2006 | Wang | .......................... 340/572.7 |
| 2011/0267086 | A1 * | 11/2011 | Pagani | ..................... 324/754.21 |

* cited by examiner

*Primary Examiner* — Sonji Johnson
(74) *Attorney, Agent, or Firm* — Turk IP Law, LLC

(57) ABSTRACT

A Radio Frequency Identification (RFID) assembly includes an IC, a repassivation layer disposed on the IC, and an inductor disposed on the repassivation layer. The IC includes a gapped seal ring. The inductor may couple to an RFID tag antenna, thereby allowing the IC to transmit and receive RF signals.

20 Claims, 14 Drawing Sheets

*RFID TAG IC COMPONENTS*

*SIGNAL PATH DURING R→T*

*SIGNAL PATH DURING T→R*

RFID TAGS WITH INDUCTIVELY COUPLED ANTENNAS

This application claims the benefit of U.S. Provisional Patent Application Ser. No. 61/754,897, filed on Jan. 21, 2013. The disclosure of the Provisional Patent Application is hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In earlier RFID tags the power-management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag integrated circuit (IC) with an integrated inductor. The integrated inductor is disposed on a repassivation layer deposited on the IC. The IC may inductively couple to an RFID tag antenna via the integrated inductor to transmit and receive RF signals.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc., which is hereby incorporated by reference.

Figure 1:
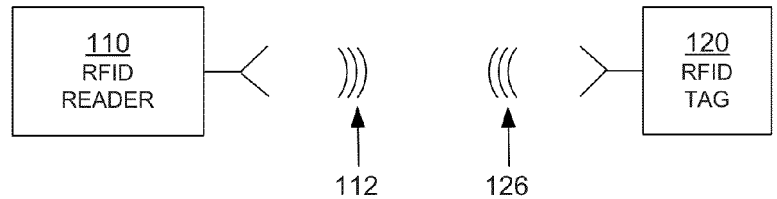
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
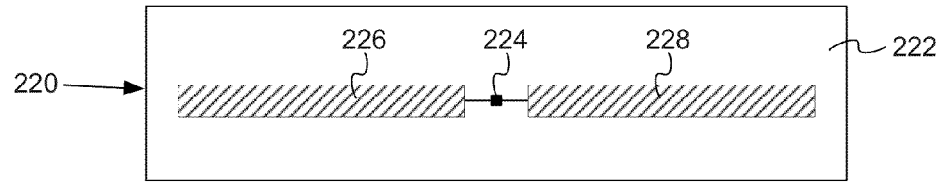
FIG. 2 is a diagram showing components of a passive RFID tag, such as a tag that can be used in the system of FIG. 1.
Figure 2:
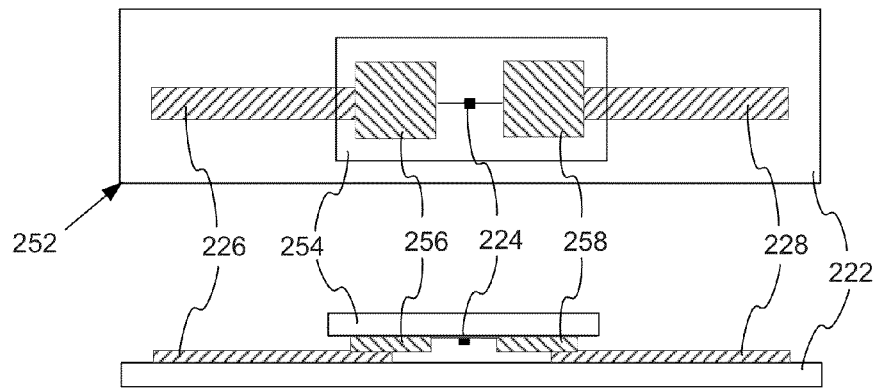
Figure 2:
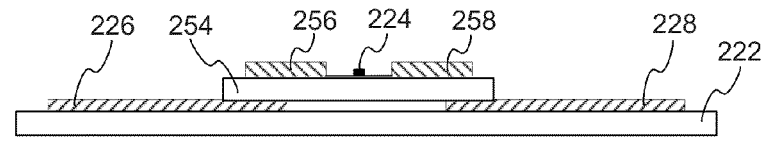

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
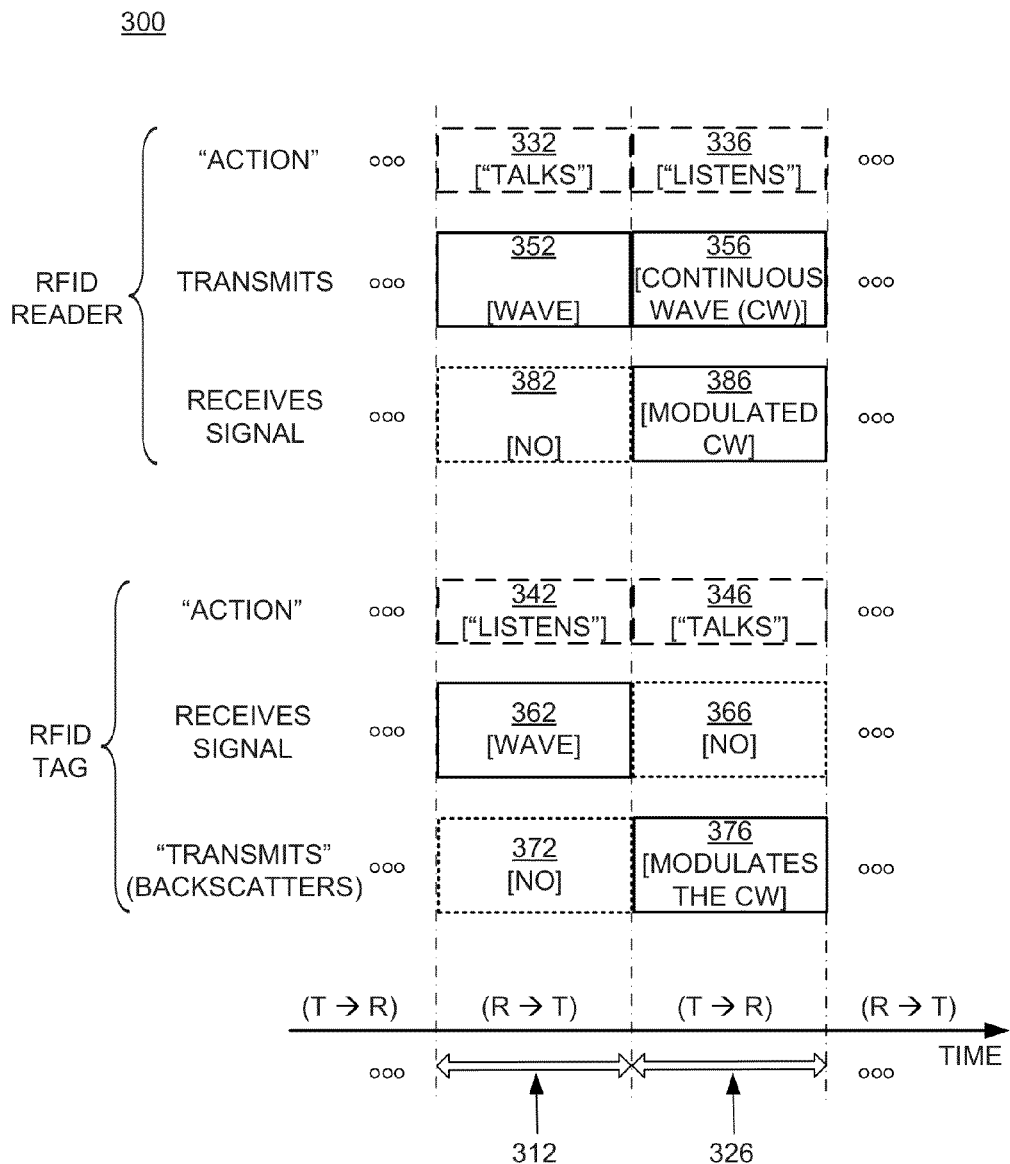
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
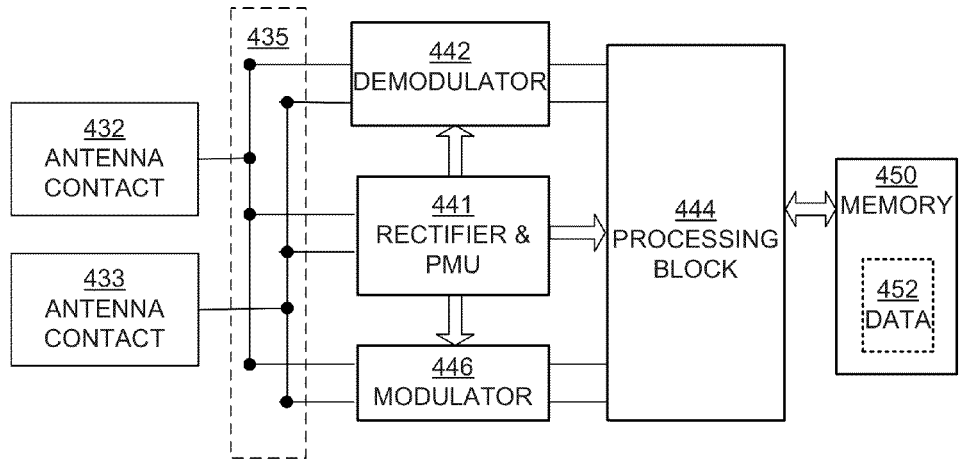
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the implementation.

Circuit 424 shows two antenna contacts 432, 433, suitable for coupling to antenna segments such as segments 226 and 228 of RFID tag 220 of FIG. 2. When two antenna contacts form the signal input from, and signal return to, an antenna, they are often referred-to as an antenna port. Antenna contacts 432, 433 may be made in any suitable way, such as from metallic pads and so on. In some embodiments circuit 424 uses more than two antenna contacts, especially when tag 220 has more than one antenna port and/or more than one antenna.

Circuit 424 also includes signal-routing section 435 which may include signal wiring, a receive/transmit switch that can selectively route a signal, and so on.

Circuit 424 also includes a rectifier and PMU (Power Management Unit) 441 that harvests energy from the RF signal received by an antenna to power the circuits of IC 424 during either or both reader-to-tag (R→T) and tag-to-reader (T→R) sessions. Rectifier and PMU 441 may be implemented in any way known in the art. In some embodiments, rectifier and PMU 441 may be differential.

Circuit 424 additionally includes a demodulator 442 that demodulates the RF signal received via antenna contacts 432, 433. Demodulator 442 may be implemented in any way known in the art, for example including a slicer, an amplifier, and so on. In some embodiments demodulator 442 may be a differential demodulator.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving antenna contacts 432, 433, and therefore driving the load presented by the coupled antenna segment or segments. Modulator 446 may be implemented in any way known in the art, for example including a switch, driver, amplifier, and so on. In some embodiments modulator 446 may be a differential modulator.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
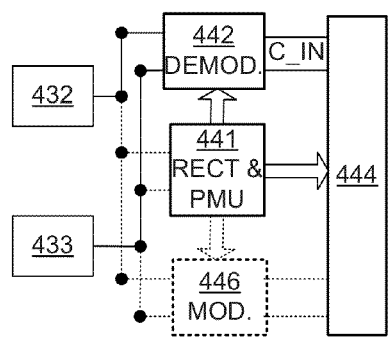
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from antenna contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
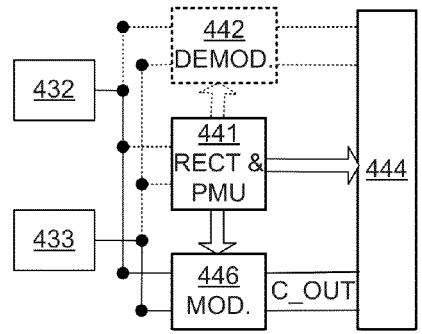

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226 and 228 of RFID tag 220 via antenna contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as Version 1.2.0 or Version 2.0.0 of the Generation-2 UHF RFID Protocol for Communications at 860 MHz-960 MHz ("Gen2 Specification") by GS1 EPCglobal, Inc., which are hereby incorporated by reference in their entirety. GS1 maintains these documents on their website at <http://www.gs1.org/epcglobal/> at the time this document is initially filed with the USPTO. A protocol specifies, in part, symbol encodings, and may include a set of modulations, rates, timings, or any other parameter associated with data communications. In embodiments where circuit 424 includes multiple demodulators and/or modulators, each may be configured to support different protocols or different sets of protocols.

As used herein, a protocol may also be a variant of a stated specification such as the Gen2 Specification, for example including fewer or additional commands than the stated specification calls for, and so on. In such instances, additional commands are sometimes called custom commands.

An RFID tag may be manufactured by placing an RFID IC (e.g., IC 224 in FIG. 2) on an antenna (e.g., the antenna formed by antenna segments 226 and 228) disposed on a substrate (e.g. substrate 222) and electrically coupling the IC's antenna contacts to terminals of the antenna. For example, an IC with antenna contacts disposed on one surface may be electrically coupled to the antenna by being placed face-down on the antenna terminals such that the antenna contacts electrically couple to the antenna terminals, or by being placed face-up with conductive bondwires connecting the antenna contacts and the antenna terminals. However, as IC sizes shrink the corresponding IC antenna contacts become smaller, both in terms of contact size and contact spacing. This shrinkage increases the cost of coupling the antenna contacts to the antenna terminals, in the face-down case due to tight alignment tolerances, and in the face-up case due to tight bondwire attachment tolerances.

Figure 6:
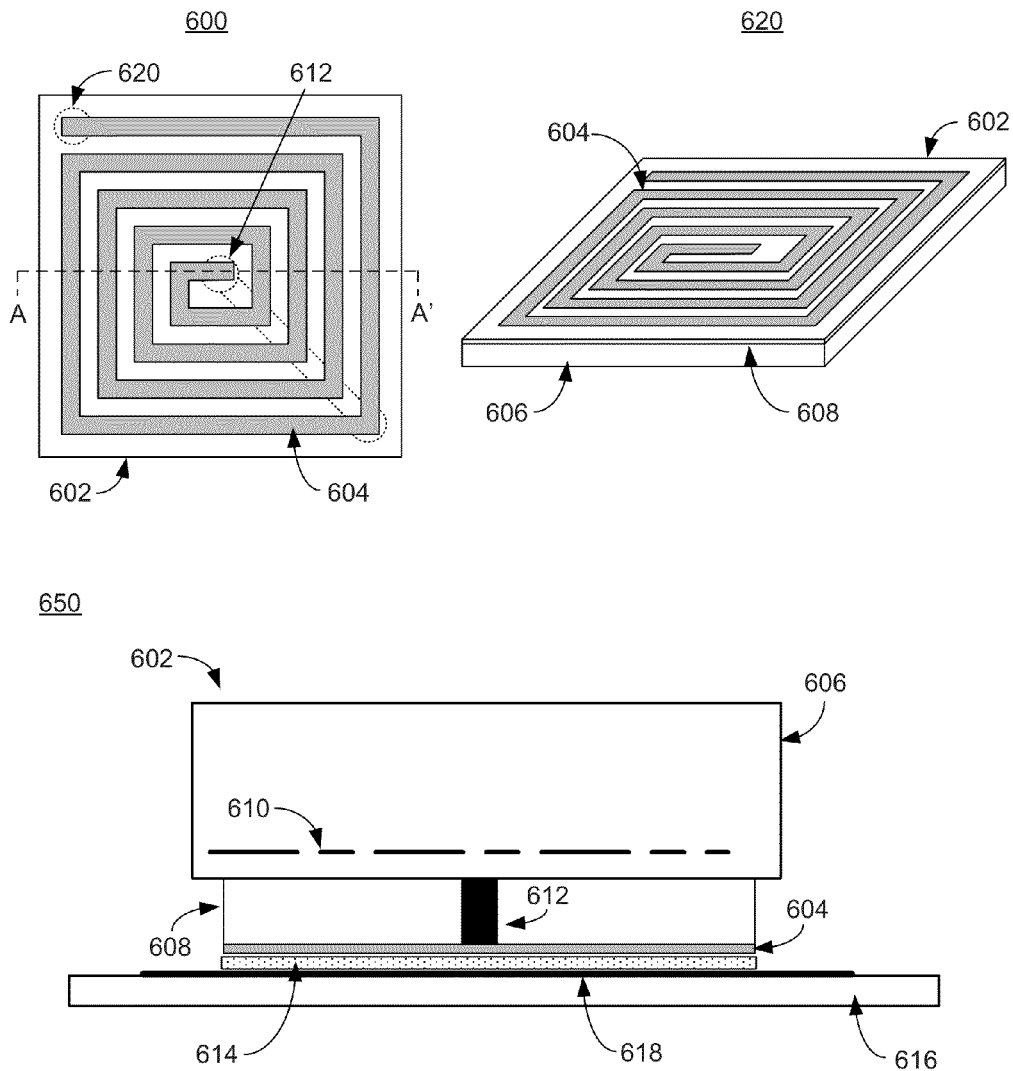
FIG. 6 depicts views of an RFID IC with an integrated inductor for coupling to an RFID tag antenna.

Using an inductor integrated on the IC to couple with the antenna may address this issue. FIG. 6 depicts a top view (600) and a perspective (620) view of an RFID IC 602 with an integrated inductor 604 for coupling to an RFID tag antenna. IC 602 includes circuitry 610 which electrically couples to inductor 604. In some embodiments, a repassivation layer 608 is disposed on IC substrate 606, inductor 604 is disposed on repassivation layer 608, and circuitry 610 electrically couples to inductor 604 through contacts 612/620. Contacts 612/620 may be formed through openings, apertures, cutouts, side contacts around, or gaps in repassivation layer 608. For example, bumps may be deposited within the gaps, or the material of inductor 604 may be allowed to encroach into the gaps to directly connect inductor 604 and circuitry 610 via antenna contacts 432/433. In other embodiments, repassivation layer 608 may be deposited such that its periphery approaches but does not entirely cover a contact region for circuitry 610. Inductor 604 may then be fabricated to physically connect to the uncovered contact region.

Repassivation layer 608 may include an organic material. Examples of organic materials include but are not limited to polyimide-based materials, polybenzoxaxole-based materials, one example of which is Spheron™ WLP manufactured by RoseStreet Labs, LLP based in Phoenix, Ariz., or benzocyclobutene-based materials (e.g., bisbenzocyclobutene, BCB).

FIG. 6 also depicts a cutaway view (650) of an RFID tag with IC 602, shown along line A-A' (shown in IC top view 600) of IC 602. To form the tag, IC 602 may be attached to a tag substrate 616 having a tag antenna 618 such that inductor 604 electrically couples with antenna 618. In some embodiments, IC 602 is attached to tag substrate 616 via an adhesive layer 614. Adhesive layer 614 may be conductive or nonconductive, and in some embodiments is an anisotropic conductive paste (ACP) or nonconductive paste (NCP).

Figure 7A:
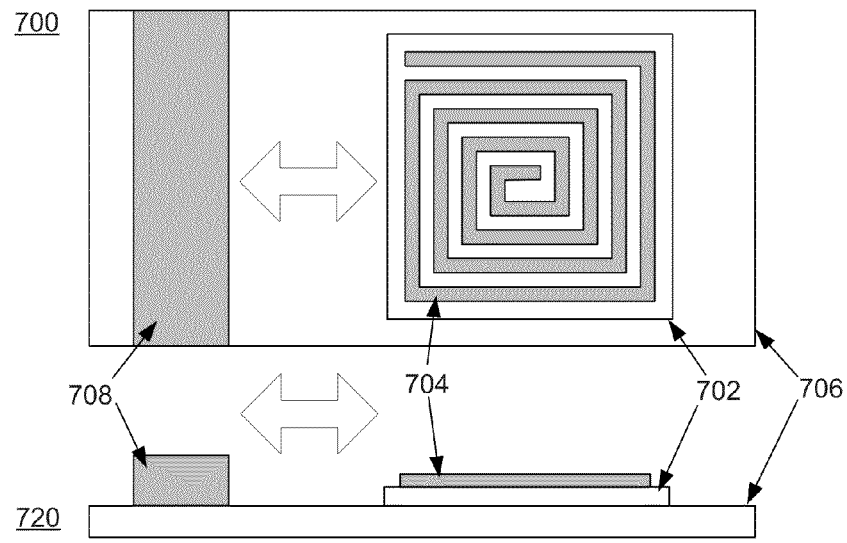
FIGS. 7A and 7B illustrate how an RFID IC with an integrated inductor couples with an RFID tag antenna according to embodiments.

FIG. 7A illustrates top (700) and side (720) views of how an RFID IC 702 with an integrated inductor 704, similar to IC 602 in FIG. 6, may inductively couple with an RFID tag antenna 708 on a tag substrate 706, thereby forming an inductively coupled antenna assembly. Antenna 708 is typically a radiative (or resonant) structure tuned to the frequencies of RFID communications. An RF signal received by antenna 708 creates a time-varying electromagnetic field that inductively couples to inductor 704, thereby transferring the signal to IC 702. Likewise, IC 702 may backscatter a signal by modulating the impedance of inductor 704, thereby modulating the reflectance of the antenna assembly comprising inductor 704 and antenna 708.

Figure 7B:
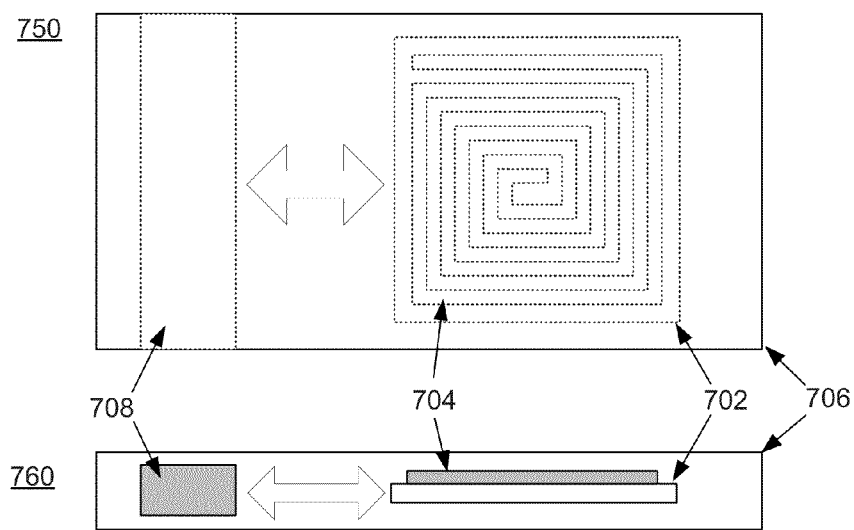

In some embodiments, one or both of IC 702 and antenna 708 may be physically embedded in tag substrate 706. FIG. 7B illustrates top (750) and side (760) views of such an embodiment. In FIG. 7B, both IC 702 and antenna 708 are depicted as embedded within tag substrate 706, although in other embodiments only one of IC 702 and antenna 708 may be embedded. Embedding IC 702 and/or antenna 708 may provide protection from external forces or other environmental damage, while retaining electrical (inductive) coupling between IC 702 and antenna 708. IC 702 and/or antenna 708 may be embedded within tag substrate 706 using any suitable method. In some embodiments, tag substrate 706 may use layers that sandwich IC 702 and/or antenna 708. In other embodiments, IC 702 may be placed in a cavity or hole formed in tag substrate 706 and the cavity or hole may be subsequently sealed using adhesives or an additional layer. In yet other embodiments, IC 702 and/or antenna 708 may be incorporated into a precursor material which is then subsequently formed into tag substrate 706. For example, IC 702 and/or antenna 708 may be incorporated into a woven or nonwoven fibrous matrix (e.g., yarn, thread, fabric, paper, etc.), a powder, a composite, or some other material. Subsequently, the material including IC 702 and/or antenna 708 may then be formed into tag substrate 706.

The position of IC 702 with respect to tag antenna 708 may be varied to some degree without materially affecting the useful electrical coupling between them. In general, the coupling is said to be useful for RF communications if a time-varying current through inductor 704 causes a measurable signal in antenna 798, and vice versa. By way of counterexample, if antenna 708 bisected inductor 704 then a time-varying current in inductor 704 would induce equal but opposite potentials in antenna 708; these potentials cancel, resulting in zero or negligible signal in antenna 708. To induce a useful communications signal, IC 702 may be positioned such that antenna 708 is close to but does not bisect inductor 704. Also, whereas inductor 704 and antenna 708 are depicted in FIGS. 7A and 7B parallel to each other on a planar substrate, they need not be so disposed. For example, in some embodiments IC 702 may be disposed with inductor 704 facing downward, or with antenna 708 on the backside of substrate 706, while still providing a signal useful for RF communications.

Figure 8A:
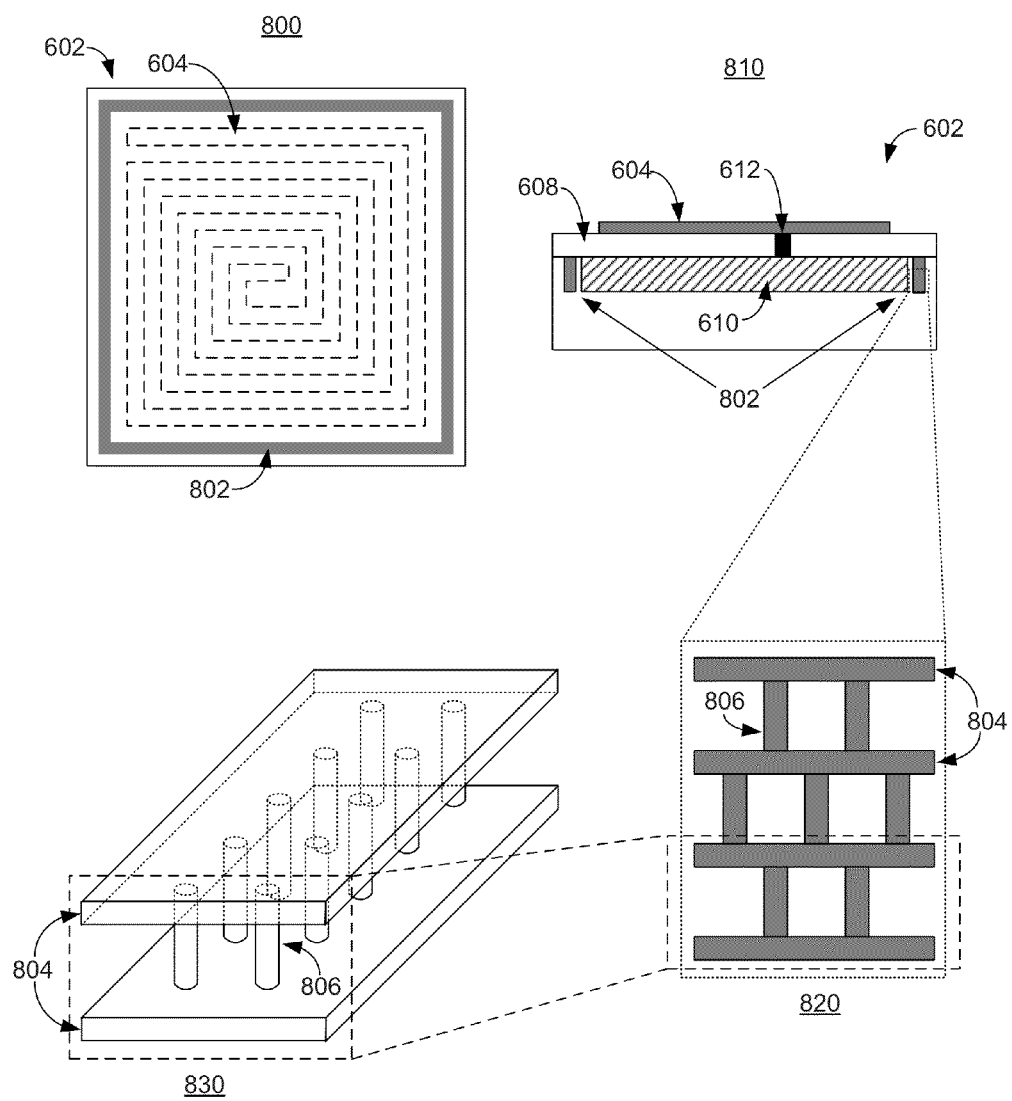
FIG. 8A depicts a seal ring for an RFID IC with an integrated inductor.

An RFID IC typically includes one or more seal rings, which are protective structures that surround the periphery of circuit block(s) in the IC and increase the physical IC strength, prevent breakage during IC processing, and/or isolate IC circuits from damage or contaminant ingress. Seal rings are often metallic and consequently electrically conductive, and are typically electrically coupled to an IC reference potential or common node, also known as ground. In some embodiments, the substrate of the IC may be electrically coupled to or serve as ground, and IC seal rings may be electrically coupled to the IC substrate. FIG. 8A depicts top (800) and cutaway (810) views of an RFID IC 602 with a seal ring 802, as well as detailed side (820) and perspective (830) views of a portion of seal ring 802. Seal ring 802 is typically a multi-layer structure comprising one or more metallic layers 804, with the layers connected by one or more vias 806, as depicted in views 820 and 830. In some embodiments, seal ring 802 may completely encircle circuitry 610 (as shown in view 800). Whereas IC 602 is depicted in FIG. 8A with one seal ring 802, in other embodiments an IC may include two or more seal rings.

Figure 8B:
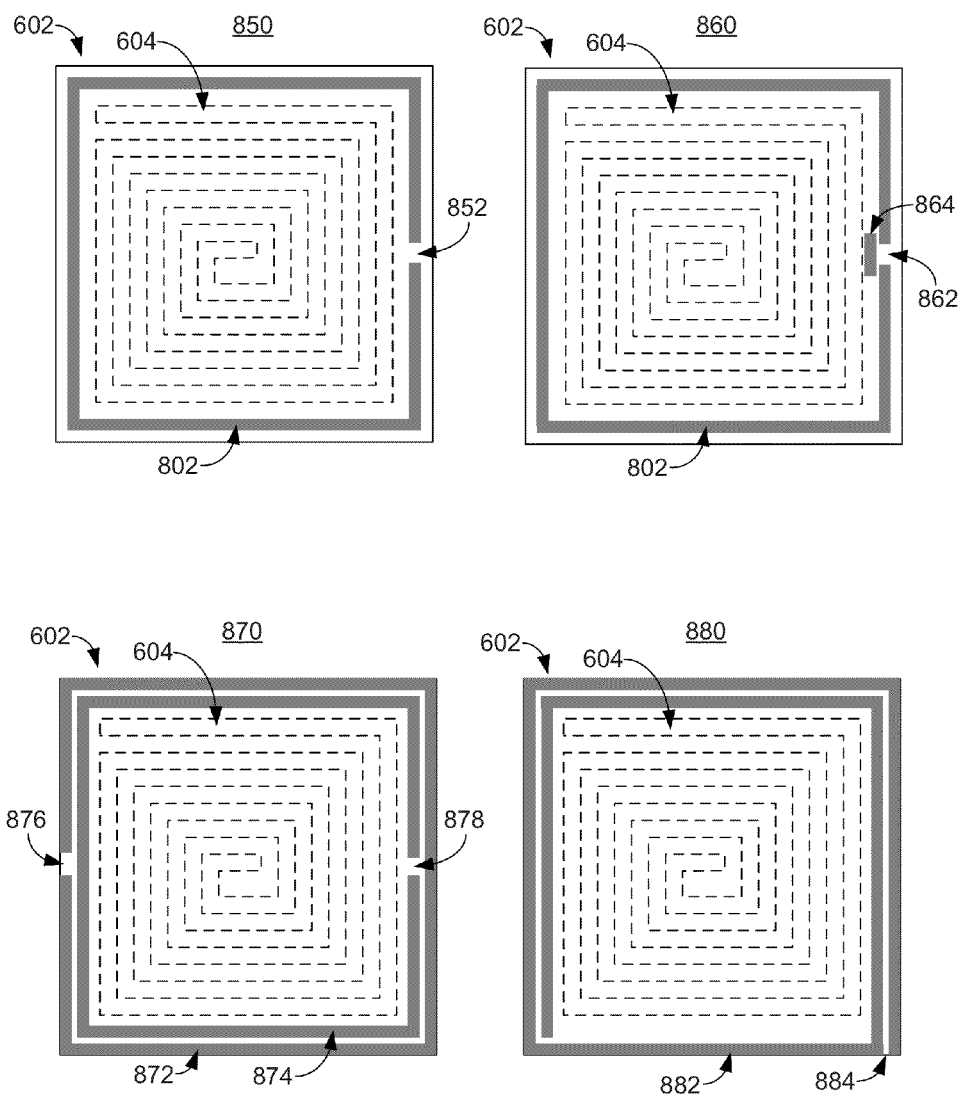
FIG. 8B depicts alternative seal ring configurations for an RFID IC with an integrated inductor according to embodiments.

In FIG. 8A, seal ring 802 is depicted as completely encircling circuitry 610. In this situation, seal ring 802, being electrically conductive, may behave as a Faraday cage around inductor 604 and interfere with the coupling between inductor 604 and an antenna, such as antenna 708 in FIG. 7. In embodiments herein, alternative seal rings may include "gaps" that break the seal ring to prevent it from behaving as a Faraday cage. FIG. 8B depicts top views of several such alternative seal ring configurations. Diagram 850 depicts a first alternative seal ring configuration, in which a gap 852 is provided in seal ring 802. Gap 852 may extend vertically through seal ring 802 in one location, as depicted in diagram 850. In other embodiments, gap 852 may be distributed throughout the different layers (e.g., layers 804) and vias (e.g., vias 806) that form seal ring 802 in any suitable fashion, as long as the resulting seal ring 802 is prevented from behaving as a Faraday cage. Also, while only one gap 852 is depicted, multiple gaps may be used.

Diagram 860 depicts a second alternative seal ring configuration similar to that depicted in diagram 850. In diagram 860, seal ring 802 is provided with gap 862, similar to gap 852. Added barrier 864 may block at least part of gap 862, without actually connecting to seal ring 802. Barrier 864, which may be a portion of a seal ring or some other structure, may compensate for some of the reduction of physical strength provided by seal ring 802 due to gap 862, and may also assist in preventing ingress into IC 602.

Diagram 870 depicts a third alternative seal ring configuration, in which IC 602 includes two concentric seal rings 872 and 874, with gaps 876 and 878, respectively. In some embodiments, gaps 876 and 878 may be positioned relatively far from each other so that physical strength reductions due to the gaps are distributed across IC 602. In other embodiments gaps 876 and 878 may be positioned relatively close to each other to reduce the capacitive coupling between the concentric rings.

Diagram 880 depicts a fourth alternative seal ring configuration, in which IC 602 includes a single die ring 882 that is shaped as a spiral, leaving gap 884 between two successive turns of the spiral. The amount of overlap between successive turns of the spiral may be based on the size of the seal ring 882, the area available for it, to minimize capacitive coupling between segments, or any other suitable parameter. In some embodiments, a seal ring may be shaped as a helix structure. For example, the seal ring may form a helical structure when successive portions of its layers (e.g., layers 804) and vias (e.g., vias 806) are removed or broken. In some embodiments, a seal ring shaped as a spiral or helix may also behave as an inductor, and may be coupled to inductor 604 to provide additional inductance.

Figure 9:
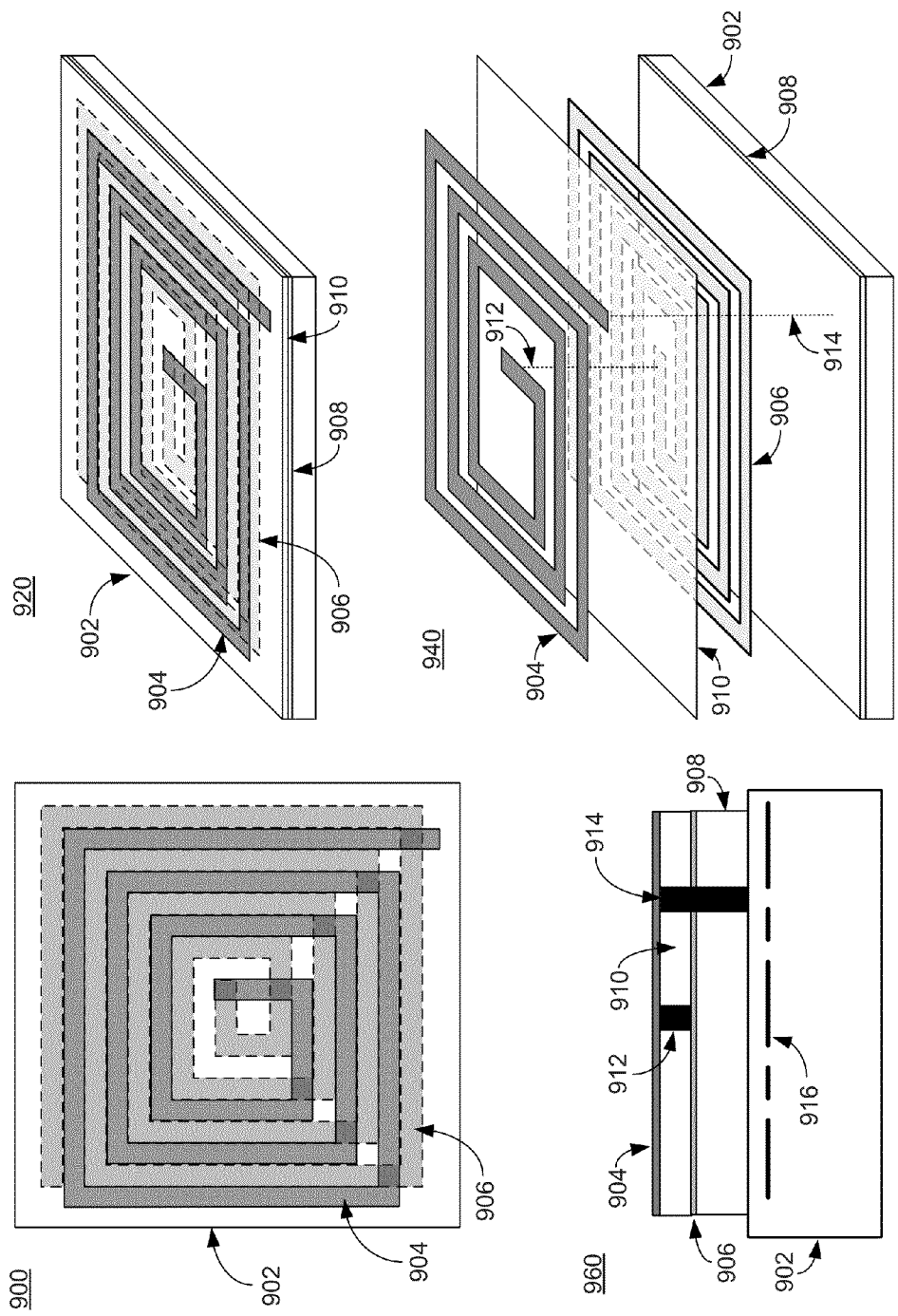
FIG. 9 depicts views of an RFID IC with a multi-layer integrated inductor for coupling to an RFID tag antenna.

In some embodiments, an integrated inductor disposed on an IC may employ multiple layers. FIG. 9 depicts views of an RFID IC with a multi-layer integrated inductor for coupling to an RFID tag antenna. As shown in views 900, 920, 940, and 960, an IC may include at least a lower inductor 906 and an upper inductor 904. Lower inductor 906 may be separated from IC 902 by a first repassivation layer 908, similar to repassivation layer 608 in FIG. 6. Upper inductor 904 may be separated from lower inductor 906 by a second repassivation layer 910. Lower inductor 906 electrically couples with circuitry 916 in IC 902 via a contact (not shown) through or around first repassivation layer 908, and electrically couples with the upper inductor 904 via contact 912 through the second repassivation layer 910. Upper inductor 904 then electrically couples with circuitry 916 via contact 914 through or around second repassivation layer 910 and first repassivation layer 908. Contacts 912/914 may be formed using vias, bumps, or a direct physical interface between the upper inductor 904 and the lower inductor 906 and/or contact regions associated with the circuitry 916, as described below.

Figure 10:
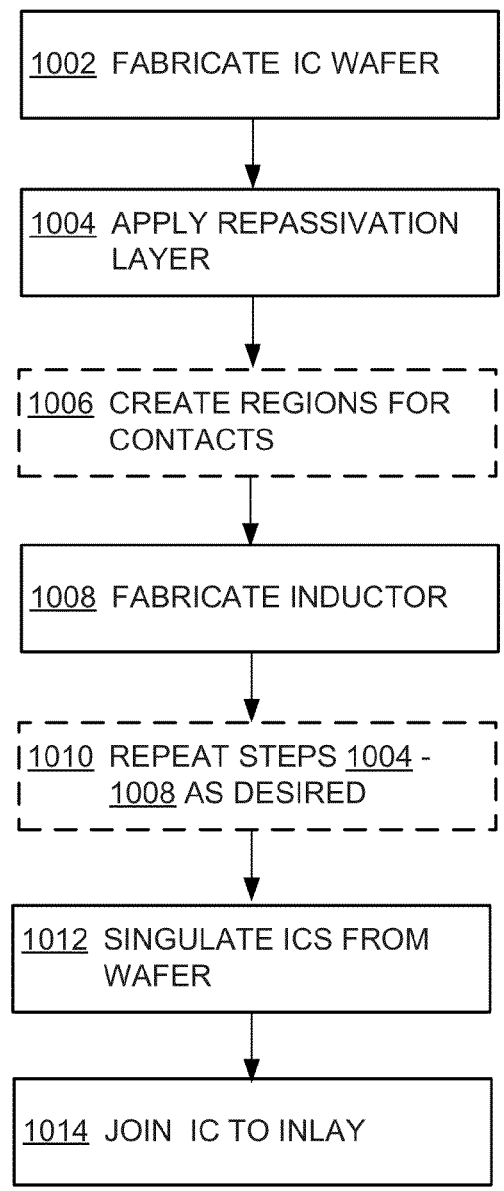
FIG. 10 is a flowchart illustrating a process for fabricating an RFID tag having an IC with an integrated inductor coupling with a tag antenna.

FIG. 10 is a flowchart illustrating a process 1000 for fabricating an RFID tag including an IC with an integrated inductor coupling to a tag antenna. Process 1000 begins with step 1002, in which a wafer having multiple ICs is fabricated. The ICs on the wafer may be fabricated with seal rings having gaps (e.g., as described in FIG. 8). In step 1004, a repassivation layer (e.g., repassivation layers 608 or 908 in FIGS. 6 and 9, respectively) is then applied to the wafer. In optional step 1006, contact regions may be created in or around the repassivation layer to connect to IC antenna contacts on the wafer. These contact regions may be formed using semiconductor processing techniques such as photolithography, masking, and etching. In one embodiment, openings may be formed in the repassivation layer over the antenna contacts on the wafer and conductive vias, bumps, or contacts then deposited in the openings. In another embodiment, openings may be formed in the repassivation layer such that the inductor (fabricated in step 1008 below) directly couples to the underlying antenna contacts. In yet another embodiment, the repassivation layer may be applied in step 1004 such that the antenna contacts remain uncovered. For example, the repassivation layer may be applied such that its periphery covers none of or a portion of the antenna contacts.

Subsequently, in step 1008, the inductor (or a portion of it) is fabricated on the repassivation layer. In one embodiment, a conductive redistribution layer made of metal or another conductive material is applied to the repassivation layer and then patterned to form the inductor. In another embodiment, a patterned inductor is applied to the repassivation layer. The inductor may be fabricated to electrically contact the IC antenna contacts through at least one of the contact regions created in step 1006. If the repassivation layer contains openings, the inductor may electrically couple to vias, bumps, or contacts deposited in the openings (if vias are present) or may physically contact and electrically couple to the underlying antenna contacts directly through the openings. As another example, if any portion of the underlying antenna contacts lie beyond the periphery of the repassivation layer (and are therefore not covered by the repassivation layer), the inductor may be fabricated so as to extend beyond the periphery of the repassivation layer, cover a portion of the sidewall or side slope of the repassivation layer, and electrically couple with the uncovered portion(s) of the underlying IC antenna contacts.

If the inductor structure includes more than two layers then in optional step 1010 the steps 1004 to 1008 may be repeated to form additional layers. For example, another repassivation layer may be applied, contact regions formed for the IC and previously-fabricated inductor(s), and another inductor fabricated and electrically coupled to the IC and/or previously-fabricated inductor(s). In this manner multi-layer inductors comprising many layers can be fabricated on an IC.

In step 1012, individual ICs may then be singulated (i.e., separated from each other) by, for example, mechanical sawing, laser dicing, annealing and breaking, or any other suitable method. In step 1014, a singulated IC may then be attached to a tag inlay with a tag antenna so as to inductively couple the IC with the tag antenna, as described above. In some embodiments the IC may be attached to an inlay using an adhesive such as a nonconductive paste (NCP) or an anisotropic conductivity paste (ACP). In other embodiments the IC may be placed into a tag inlay, as described above in FIG. 7B. In yet other embodiments, the IC may first be attached to or placed within an intermediate substrate or carrier, such as an IC strap. The carrier may be made of similar material to the tag inlay, and may also include electrical contacts or leads for electrically coupling to the IC and/or to a tag antenna on a tag inlay. Subsequently, the IC and its carrier may be joined to a tag inlay with a tag antenna as described above.

Figure 11A:
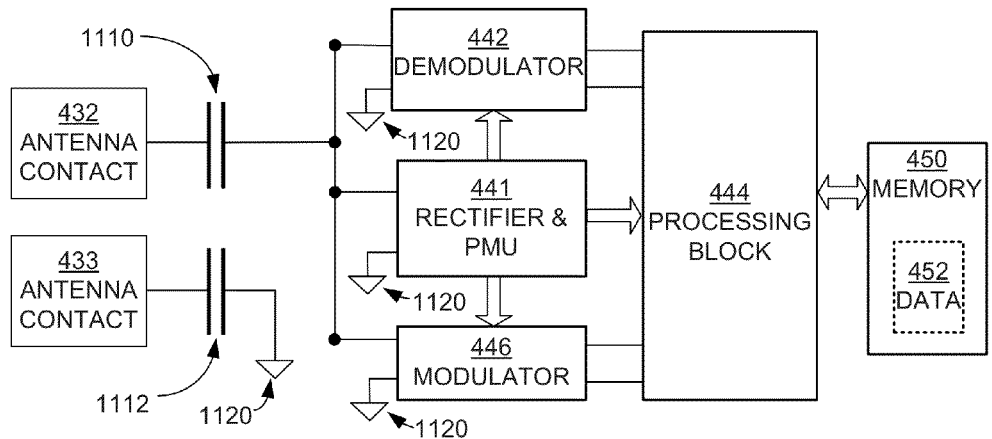
FIGS. 11A and 11B depict details of an RFID IC with single-ended circuitry and an RFID IC with differential circuitry, according to embodiments.

In some RFID IC circuits, an RF input port may include one antenna input electrically coupled to an IC reference potential or common node, also known as ground, which is itself electrically coupled to other portions of the IC, such as circuit blocks, the IC substrate, and seal rings. FIG. 11A depicts details of an RFID IC with electrical circuit 1100, similar to electrical circuit 424 described above in FIG. 4. In circuit 1100, antenna contact 432 is electrically coupled to one input of each of rectifier and PMU 441, demodulator 442, and modulator 446. Antenna contact 433 is electrically coupled to common node 1120, which as mentioned above is electrically coupled to other portions of the IC or circuit, such as another input to or portion of each of rectifier and PMU 441, demodulator 442, and modulator 446. Such a configuration is known as "single-ended", and a single-ended circuit block such as demodulator 442 is responsive to the voltage potential or current between common node 1120 and antenna contact 432. In embodiments as disclosed herein, this potential or current may be developed in an inductor (e.g., inductor 604) disposed on the surface of the IC.

Figure 11B:
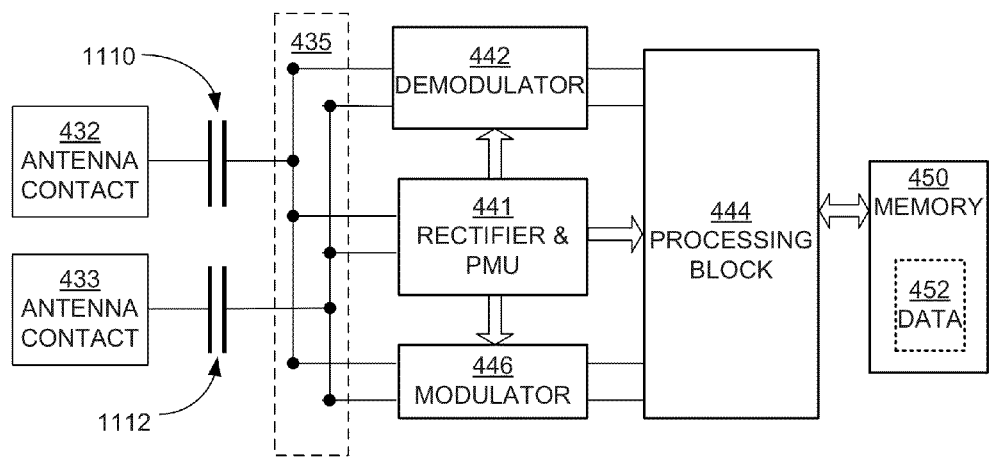

FIG. 11B depicts details of an RFID IC with alternative electrical circuit 1150. Circuit 1150 is similar to circuit 1100, with similarly-numbered elements behaving similarly. However, circuit 1150 differs from circuit 1100 in that the RF input port formed by antenna contacts 432 and 433 is electrically isolated from (i.e., not electrically coupled to) ground (e.g., common node 1120). For example, both antenna contacts 432 and 433 are electrically isolated from ground, and therefore electrically isolated from any IC component that is electrically coupled to ground (e.g., the IC substrate and seal rings). The RF input port in turn couples to the input nodes of demodulator 442, rectifier and PMU 441, and/or modulator 446. Each of demodulator 442, rectifier and PMU 441, and modulator 446 have at least two differential input nodes and differential circuit blocks that are each also electrically isolated from ground and other IC components electrically coupled to ground (e.g., the IC substrate and seal rings). Like a single-ended circuit block, a differential circuit block is responsive to a voltage or current between its two input nodes. Unlike a single-ended circuit block, a differential circuit block is not substantially responsive to a signal that is common to both input nodes (i.e. not responsive to a signal developed between both input nodes and ground). As a result, an antenna input signal received via antenna contacts 432 and 433 and provided to the differential input nodes of demodulator 442, rectifier and PMU 441, and/or modulator 446 is electrically isolated from ground. In some embodiments, circuit 1150 also includes optional capacitors 1110 and 1112 that capacitively couple antenna contacts 432/433 to rectifier and PMU 441, demodulator 442, and modulator 446, instead of galvanically coupling to them as depicted in circuit 1100.

In differential embodiments, as in single-ended embodiments, circuit 1150 and its constituent circuit blocks are responsive to a voltage potential or current developed between the antenna contacts 432 and 433, and this potential or current may be developed in an inductor (e.g., inductor 604) disposed on the surface of the IC. What is different is that in circuit 1150 this voltage potential or current is isolated from the common node, whereas in circuit 1100 the voltage potential or current is coupled to the common node.

Figure 12:
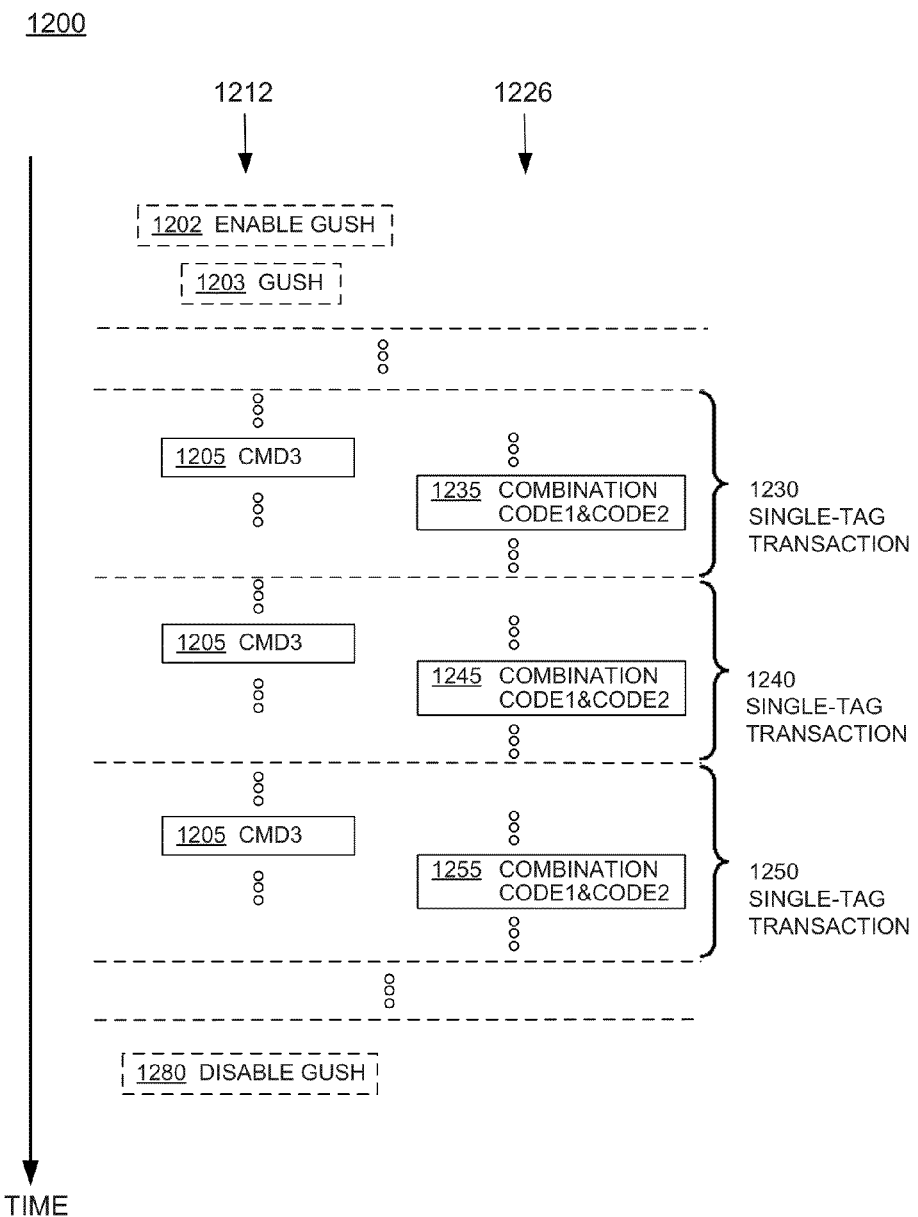
FIG. 12 is a timing diagram showing commands from an RFID reader and responses from a population of RFID tags with integrated inductors for reading code combinations from the tags according to embodiments.

In some embodiments, a tag IC with an integrated inductor may be configured to backscatter a combination of codes, as described in U.S. Pat. No. 8,174,367 issued on May 8, 2012, which has been incorporated by reference. FIG. 12 is a timing diagram 1200 showing commands from an RFID reader and replies by a population of RFID tags with integrated inductors according to embodiments. Neither the reader nor the tags are shown in diagram 1200. In some embodiments, the tags may store a first code and a second code. The commands in diagram 1200 cause tags to "gush" a reply comprising combinations of first and second codes, without any intervening reader commands between them, according to embodiments.

Timing diagram 1200 proceeds downward along a vertical axis TIME, with commands 1212 transmitted by the reader alternating with replies 1226 from the tags. In the example of diagram 1200, the reader first instructs the tags to gush their replies by means of one or more of an optional ENABLE GUSH command 1202 and a GUSH command 1203. During each single-tag transaction a reader has a transaction with the singulated tag and receives tag data. Three example transactions 1230, 1240, and 1250 are described, but more or fewer such transactions may take place. Each transaction is not necessarily described in full, but only some pertinent commands are given. For example, commands to singulate each tag for its transaction are not shown. Finally, an optional DISABLE GUSH command may terminate the gushing behavior.

In first transaction 1230 with a first singulated tag, command CMD3 1205 causes the first tag to send a reply 1235 combining at least a portion of code1 and at least a portion of code2 from tag memory, without the tag receiving a reader command in-between sending the two code portions. In transaction 1240 with a second singulated tag, a repeated command CMD3 1205 elicits a combination 1245 from the second tag, again with no intervening command. Then in transaction 1250 with a third singulated tag, a repeated command CMD3 1205 elicits a combination 1255 from the third tag, again with no intervening command.

In some embodiments transactions 1230, 1240, and 1250 may take less time than transactions that involve sending the first and second codes separately, with an intervening reader command in between.

Figure 13:
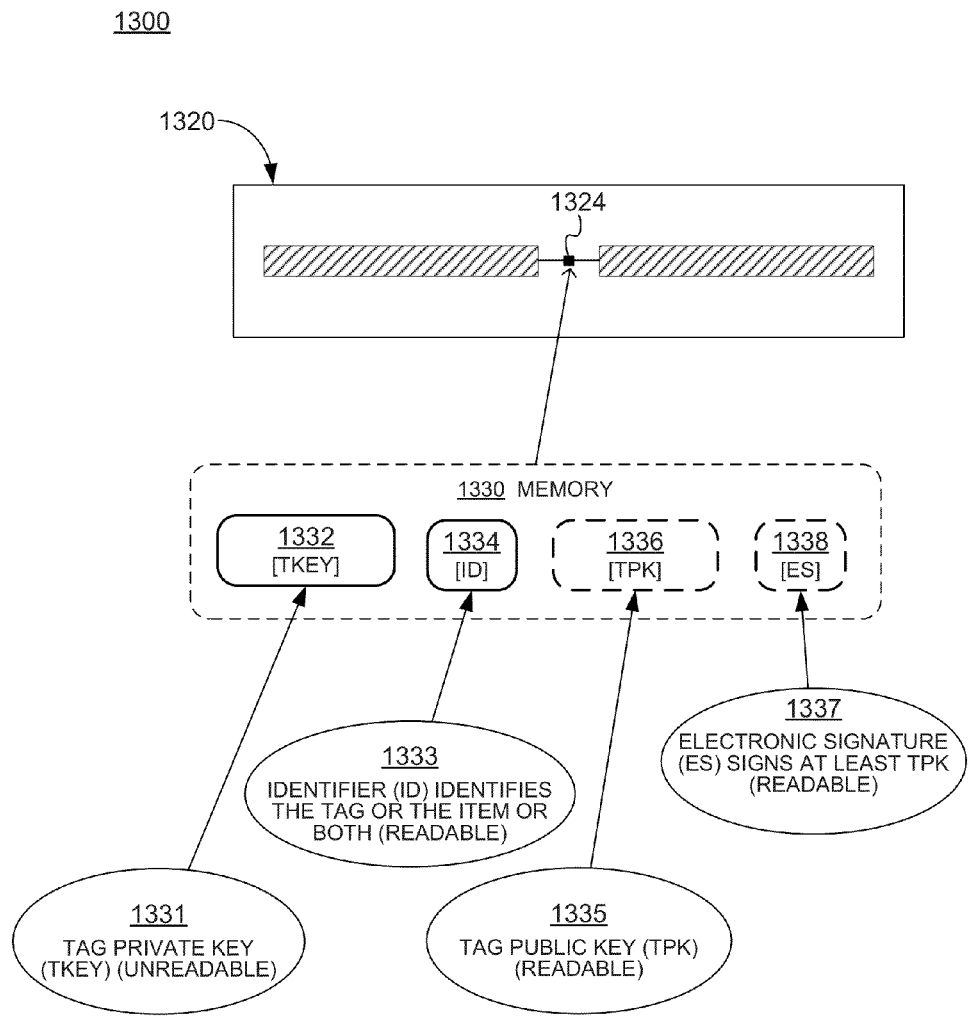
FIG. 13 illustrates a tag private key, an identifier, a tag public key, and an electronic signature stored in an RFID IC with an integrated inductor according to embodiments.

In some embodiments, an RFID IC with an integrated inductor may be configured to use symmetric or asymmetric cryptographic algorithms. FIG. 13 illustrates how a tag secret key, an identifier, an optional tag public key, and an optional electronic signature may be stored in an RFID tag according to embodiments.

Tag memory 1330, which is part of tag IC 1324 (similar to IC 602) of a tag 1320, shown in diagram 1300, may store a variety of data. The data may include a tag secret key (TKEY) 1332 and an identifier (ID) 1334. In some embodiments, the data may also include a tag public key (TPK) 1336 and/or an electronic signature (ES) 1338.

In some embodiments, a tag manufacturer or other legitimate entity may generate the TKEY 1332 (if using symmetric cryptographic algorithms) or a private-public key pair (if using asymmetric cryptographic algorithms). The tag keeps its TKEY 1332 secret, and uses it when responding to reader challenges. In some embodiments where an asymmetric cryptographic algorithm is used, a signing authority that holds a master private-public key pair may generate a tag-specific ES 1338 based on at least the signing authority's master private key and the TPK 1336. The tag does not normally keep either the TPK 1336 or the ES 1338 secret. The ES 1338 may sign the ID 1334 and/or other tag information as well.

As shown in FIG. 13, the tag stores its TKEY 1332 in memory portion 1331 which is typically unreadable by a reader. The tag stores its ID 1334, which identifies the tag and/or an item to which the tag is attached, in memory portion 1333 which is typically readable by a reader. This ID may be a tag identifier (TID), item identifier like an EPC code (EPC) or a unique item identifier (UII), or other number like a serialized global trade identification number (SGTIN) according to some standardized protocols. If the tag has the public key TPK 1336, it may store it in memory portion 1335 which is typically readable by a reader. The ES 1338 if present may be stored in memory portion 1337 which is also typically readable by a reader.

Counterfeiters can clone tags that do not have a hidden key or other hidden secret by simply copying the tag memory contents. Counterfeiters cannot easily clone tags built according to embodiments because the tags contain an unreadable TKEY and use challenge-response methods for authentication.

Embodiments can be used for items and applications requiring counterfeit detection, where genuine items have authentic tags but non-genuine items do not have authentic tags and can be discovered, traced, and removed. Example applications include retail, food safety, pharmaceutical, document protection, and the currency industries.

Figure 14:
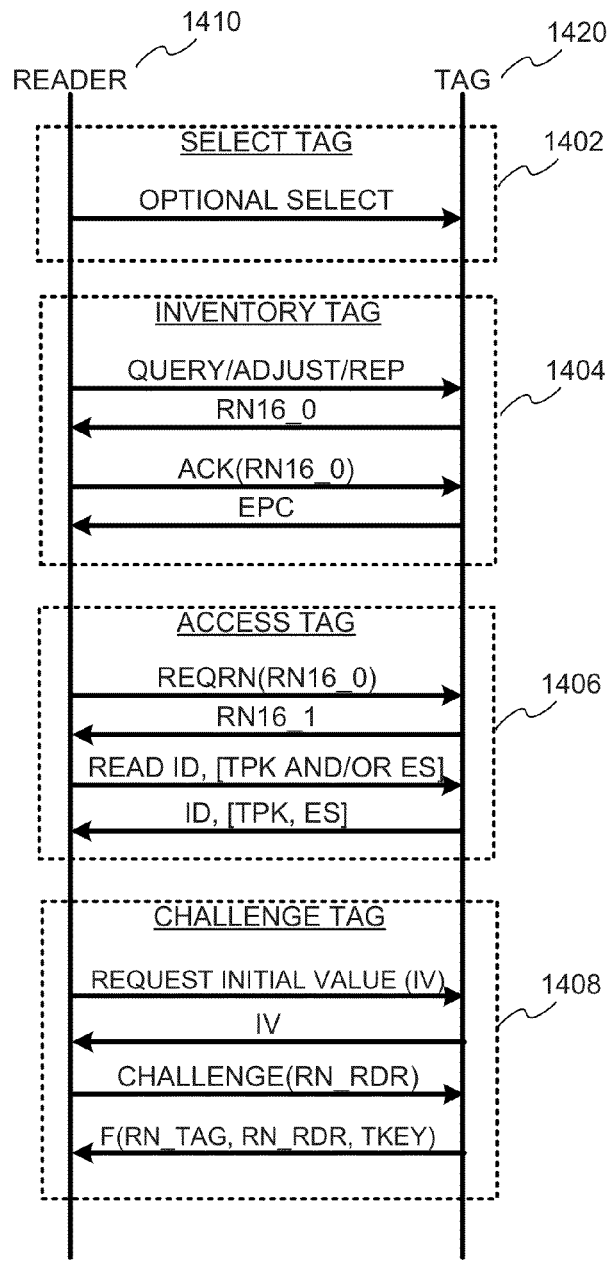
FIG. 14 illustrates exchanges between a reader and a tag with an integrated inductor according to embodiments.

FIG. 14 illustrates command-response exchanges between a reader and a tag with an integrated inductor according to embodiments. Although the commands and responses in diagram 1400 of FIG. 14 assume that the reader and tag are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 14. Other orderings are possible; exchanges can be merged, enhanced, or eliminated; and the authentication can be spread across various operations between reader and tag.

The interactions between reader 1410 and tag 1420 in diagram 1400 begin with an optional tag selection 1402, where the reader selects one or more tags from among a tag population for subsequent inventory and authentication. This optional selection is followed by an inventory 1404, where the reader singulates a tag and receives an identifier from the tag. The shown inventory uses the Query-ACK sequence described in the Gen2 Specification. Inventory is followed by access 1406, where the reader accesses the tag and reads the tag's ID and optionally a TPK (if using asymmetric cryptographic algorithms) and/or ES (if present). Finally, access is followed by authentication 1408, where the reader authenticates the tag using a challenge-response dialog as described herein. If a symmetric cryptographic algorithm is used, the reader may a priori know the tag's TKEY and use it to decrypt encrypted messages from the tag. If an asymmetric cryptographic algorithm is used, the reader may use the retrieved TPK to decrypt encrypted messages from the tag.

As described above, embodiments include different orderings of interactions between reader and tag. For example, in some embodiments the reader may send a challenge during tag selection 1402, preceding the access 1406, and the tag may compute its response and store the response in memory for subsequent reading by a reader. The tag's computation may include a tag random number, and the tag may also store this random number for subsequent reading by the reader. Indeed, in embodiments where the challenge occurs during tag selection, and reading the response occurs during tag access, authentication 1408 need not exist, because its operations have been spread among select 1402 and access 1406. One reason a reader may choose to send the challenge with select 1402 is for multiple tags to hear the challenge and compute their cryptographic responses in parallel. Because cryptographic computations can be time intensive, enabling multiple tags to compute their responses in parallel allows more rapid authentication of a population of tags.

Authentication 1408 can include many options, depending on the chosen cryptographic algorithm. In the particular embodiment shown in FIG. 14, the reader first requests a tag random number from the tag. The tag generates a tag random number, calculates an initial value (IV) from the tag random number and the TKEY, and sends the IV to the reader. The reader then challenges the tag with a reader-generated random number. The tag computes its response based on the TKEY, the tag random number, and the reader challenge, and sends its response to the reader. At this point the reader can verify the tag's response using the IV, the reader random number, and the TPK (if using asymmetric cryptographic algorithms) or TKEY (if using symmetric cryptographic algorithms). In the asymmetric case, the reader may have previously retrieved the tag TPK (as described below). In the symmetric case, the reader may already know the tag's TKEY, for example by previously retrieving it from a network location or having it pre-programmed into the reader. Of course, some challenge-response variants do not use an IV; others may include a command count or a message-authentication code; others may include the reader encrypting the random number in the reader challenge; and yet others may include fewer or more steps than shown.

In embodiments using asymmetric cryptographic algorithms where the tag stores a TPK and an ES, a reader may retrieve the tag TPK and ES, obtain the signing authority's master public key via a network or other means, verify the TPK, challenge the tag with a random number, receive the tag's response, and verify the response using the TPK. In some embodiments the reader may also retrieve an ID from the tag, and may use the ID to indicate a signing authority or a particular master key. In some embodiments the challenge may include the reader encrypting a random number (RN) using the TPK, sending the encrypted RN to the tag, receive a decrypted RN from tag, and verifying by comparing the RN before encryption with the received, decrypted RN. In other embodiments the challenge may include the reader sending an RN to the tag, receiving an encrypted RN from tag, decrypting the received RN using the TPK, and verifying by comparing the sent RN with the decrypted, received RN.

Figure 15:
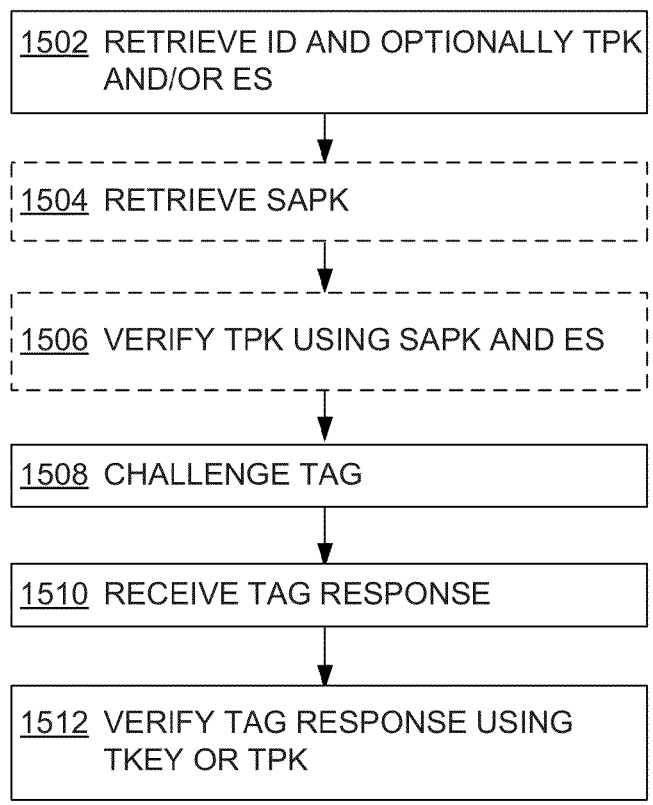
FIG. 15 is a flowchart illustrating a process for a reader authenticating a tag with an integrated inductor according to embodiments.

FIG. 15 is a flowchart illustrating a process for a reader authenticating a tag with an integrated inductor according to embodiments.

Process 1500 begins with operation 1502, where the reader retrieves one or more of a tag identifier, item identifier, or another type of identifier. In some embodiments involving asymmetric cryptographic algorithms, the reader may also retrieve a TPK and/or an ES from a tag. At optional operation 1504, if an asymmetric cryptographic algorithm is used the reader may retrieve a signing authority public key (SAPK) that corresponds to the retrieved ES. The SAPK may be associated with a signing authority (e.g., the same signing authority that provided the ES), and the reader may retrieve the SAPK from reader memory or from a remote location. In some embodiments the reader may use the ID to help identify the proper signing authority, or may use the ID to help identify which SAPK to use from a given signing authority. In optional operation 1506 the reader may verify the TPK using the SAPK and the ES. At operation 1508 the reader challenges the tag. At operation 1510 the reader receives a tag response to the challenge. At operation 1512 the reader verifies the tag response using the TPK (if using an asymmetric algorithm) or a TKEY previously known to the reader. If the verification is successful then the tag is presumed genuine.

The operations described in process 1000 and 1500 are for illustrative purposes only. Processes involving RFID ICs with integrated inductors may be implemented using additional or fewer operations and in different orders using the principles described herein.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways as mentioned above, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A Radio Frequency Identification (RFID) assembly comprising:
    an integrated circuit (IC) including a circuit block, a first antenna port coupled to the circuit block and including at least two antenna contacts, and a gapped seal ring surrounding the circuit block;
    a nonconductive repassivation layer deposited on the IC and confined within a perimeter of the IC; and
    an inductor disposed on the nonconductive repassivation layer, wherein the inductor is:
        confined within a perimeter of the nonconductive repassivation layer, and
        electrically coupled to the at least two antenna contacts through at least one of a via through, and a sidewall connection around, the nonconductive repassivation layer.

2. The assembly of claim 1, wherein the gapped seal ring includes at least one of:
    a conductive seal ring with an opening;
    a conductive seal ring with a secondarily blocked opening;
    a multilayer conductive seal ring with openings in each of the layers;
    a plurality of concentric conductive seal rings, each including an opening;
    a conductive spiral; and
    a conductive helix.

3. The assembly of claim 1, wherein the inductor includes a first spiral conductive structure disposed on and spanning a substantial portion of the nonconductive repassivation layer.

4. The assembly of claim 1, further comprising
    another nonconductive repassivation layer disposed on the inductor; and
    another inductor disposed on the other nonconductive repassivation layer; wherein the other inductor is electrically coupled to the circuit block.

5. The assembly of claim 1, wherein the circuit block further includes a rectifier having at least two inputs, each input electrically isolated from the seal ring.

6. A Radio Frequency Identification (RFID) tag comprising:
    a tag substrate including an antenna; and
    an RFID assembly including:
        an integrated circuit (IC) including a circuit block, a first antenna port coupled to the circuit block and including at least two antenna contacts, and a gapped seal ring surrounding the circuit block;
        a nonconductive repassivation layer deposited on the IC and confined within a perimeter of the IC; and
        an inductor disposed on the nonconductive repassivation layer, wherein the inductor is:
            confined within a perimeter of the nonconductive repassivation layer; and
            electrically coupled to the at least two antenna contacts through at least one of a via through, and a sidewall connection around, the nonconductive repassivation layer, wherein:
    the assembly is joined with the tag substrate such that the inductor is electrically coupled to the antenna.

7. The tag of claim 6, wherein the gapped seal ring includes at least one of:
    a conductive seal ring with an opening;
    a conductive seal ring with a secondarily blocked opening;
    a multilayer conductive seal ring with openings in each of the layers;
    a plurality of concentric conductive seal rings, each including n opening;
    a conductive spiral; and
    a conductive helix.

8. The tag of claim 6, wherein the inductor includes a spiral conductive structure disposed on and spanning a substantial portion of the nonconductive repassivation layer.

9. The tag of claim 6, wherein the IC circuit block further includes a rectifier having at least two inputs, each input electrically isolated from the seal ring.

10. The tag of claim 6, further comprising an assembly carrier, wherein the assembly carrier is attached to the assembly and joined with the tag substrate.

11. The tag of claim 6, wherein the assembly is joined with the tag substrate by at least one of:
    disposing the assembly within the tag substrate;
    disposing the assembly on a surface of the tag substrate;
    disposing the assembly within an additional layer disposed on the surface of the tag substrate; and
    disposing the assembly on a surface of the additional layer.

12. The tag of claim 6, wherein the electrical coupling between the inductor and the antenna is inductive.

13. The tag of claim 6, wherein the assembly is joined with the tag substrate such that the inductor does not physically contact any portion of the antenna.

14. A method for assembling a Radio Frequency Identification (RFID) tag, the method comprising:
  providing a tag substrate including an antenna;
  providing an RFID assembly including:
    an integrated circuit (IC) including a circuit block, a first antenna port coupled to the circuit block and including at least two antenna contacts, and a gapped seal ring surrounding the circuit block;
    a nonconductive repassivation layer disposed on the IC and confined within a perimeter of the IC; and
    an inductor disposed on the nonconductive repassivation layer, wherein the inductor is:
      confined within a perimeter of the nonconductive repassivation layer; and
      electrically coupled to the at least two antenna contacts through at least one of a via through, and a sidewall connection around, the nonconductive repassivation layer; and
  joining the assembly to the tag substrate such that the inductor is electrically coupled to the antenna.

15. The method of claim 14, wherein the gapped seal ring includes at least one of:
  a conductive seal ring with an opening;
  a conductive seal ring with a secondarily blocked opening;
  a multilayer conductive seal ring with openings in each of the layers;
  a plurality of concentric conductive seal rings, each including n opening;
  a conductive spiral; and
  a conductive helix.

16. The method of claim 14, wherein the inductor includes a spiral conductive structure disposed on and spanning a substantial portion of the nonconductive repassivation layer.

17. The method of claim 14, wherein the assembly further includes:
  Another nonconductive repassivation layer disposed on the inductor; and
  another inductor disposed on the other nonconductive repassivation layer; wherein the other inductor is electrically coupled to the circuit block.

18. The method of claim 14, further comprising providing an assembly carrier, and wherein joining the assembly to the tag substrate includes:
  attaching the assembly carrier to the assembly; and
  joining the assembly carrier to the tag substrate.

19. The method of claim 14, further comprising joining the assembly to the tag substrate by at least one of:
  disposing the assembly within the tag substrate;
  disposing the assembly on a surface of the tag substrate;
  disposing the assembly within an additional layer disposed on the surface of the tag substrate; and
  disposing the assembly on a surface of the additional layer.

20. The method of claim 14, wherein the electrical coupling between the inductor and the antenna is inductive.

\* \* \* \* \*